United States Patent [19]
Dobson et al.

[11] Patent Number: 5,242,877
[45] Date of Patent: Sep. 7, 1993

[54] POLYMER-SUPPORTED CATALYSTS

[75] Inventors: John C. Dobson, Lansdale; Christine McDade, North Wales; Mario G. L. Mirabelli, Horsham; Jeremia J. Venter, Telford, all of Pa.

[73] Assignee: Rohm and Haas Company, Philadelphia, Pa.

[21] Appl. No.: 840,714

[22] Filed: Feb. 21, 1992

[51] Int. Cl.$^5$ .............................. B01J 31/00
[52] U.S. Cl. .................................. 502/159
[58] Field of Search ........................ 502/159

[56]  References Cited

U.S. PATENT DOCUMENTS

| | | |
|---|---|---|
| 3,726,809 | 4/1973 | Allum et al. . |
| 4,032,550 | 6/1977 | White et al. . |
| 4,043,941 | 8/1977 | White et al. . |
| 4,080,490 | 3/1978 | Dawans et al. ............ 502/159 |
| 4,202,990 | 5/1980 | Murakimi et al. . |
| 4,224,415 | 9/1980 | Meitzner et al. . |
| 4,246,386 | 1/1981 | Howell et al. . |
| 4,292,253 | 9/1981 | Ozin et al. . |
| 4,500,601 | 2/1985 | Whitcomb . |
| 4,916,108 | 4/1990 | McLaughlin et al. . |
| 4,927,897 | 5/1990 | Kawata et al. ............ 502/159 |
| 5,026,675 | 6/1991 | Braca et al. ............ 502/159 |

FOREIGN PATENT DOCUMENTS 345573 5/1989 European Pat. Off. .
2204850 9/1987 Japan .

OTHER PUBLICATIONS

Anderson et al; "Hydrogenation of Fatty Oils Under Mild Conditions with Palladium-based Coordination Catalyst Anchored to Organic Polymer Matrices", Chemica Scripta, vol. 15, pp. 45–48, 1980.
Bhaduri, S.; Khwaja, H.; Khanwalker, V. J. Chem. Soc. Dalton Trans. 1982, 445–450.
Tomido et al., Polymer, 1990, vol. 3, Jan., pp. 102–105.
Right, R. S. and Colville, N. J., South African J. Chem., 1989 42(3) pp. 85–95.

*Primary Examiner*—Patrick P. Garvin
*Assistant Examiner*—E. D. Irzinski
*Attorney, Agent, or Firm*—Terence P. Strobaugh

[57]  ABSTRACT

A polymer support catalyst containing polymerized units of a polymerizable chelated metal species coordinated to one or more polydentate ligands to provide three or more chelate bonds to the metal atom.

9 Claims, No Drawings

POLYMER-SUPPORTED CATALYSTS

BACKGROUND

A catalyst may be defined as a substance which changes the rate of a chemical reaction without undergoing any net change itself. Many times only trace amounts of the catalytic material are sufficient to bring about manifold changes in the rate of chemical reaction. Although the phenomenon of catalysis was recognized in the mid 1850's, many challenges still exist in the development of efficient catalyst systems.

Over 40% of all petroleum products and 50% of all organic chemicals are dependent upon catalysts for their commercial production. The widespread use of catalysts in organic processes is largely due to their amenability to continuous processes with decreased labor costs. Oftentimes, higher purity and greater uniformity of product also result from the choice of catalysts.

Catalytic reactions are of two general types; homogenous catalysis and heterogenous. Catalysts that operate in the same phase as the reactants are known as homogeneous catalysts while catalysts that operate in a separate phase from the reactants are known as heterogeneous catalysts. In heterogeneous systems there is a distinct interface between catalyst and reactants. Catalysts speed up a reaction by lowering the activation energy.

There have been many attempts to prepare useful heterogeneous catalysts Bhadure, S., et. al., *J. Chem. Soc., Dalton Tran.* 1982, 445-450 prepared heterogeneous catalysts from divinylbenzene cross-linked polystyrene beads which were functionalized to support 2,4-pentanedionato complexes of certain metals. These metals included iron, copper, vanadium and zirconium. Cross-linked polystyrene beads were chloromethylated and treated with 2,4-pentanedione and sodium ethoxide in tetrahydrofuran. The functionalized beads were then heated with 2,4-pentanedionato metal complexes such that ligand exchange reactions resulted in polymer anchored metal complexes.

These catalysts suffer drawbacks when used as heterogeneous catalysts for liquid-phase transesterification reactions. The reason for the poor performance of these catalysts is that the metal leaches from the polymer into the reaction solution. In typical polymer-supported metal catalysts, the metal is attached to the polymer support by weak bonds which are ineffective at preventing the metal from leaching into the reaction solutions. Depletion of the metal in the heterogeneous catalyst results in decreased heterogeneous catalyst activity and may lead to undesired homogeneous catalysis.

The present invention solves the metal leaching problem by incorporating into the polymerization process a metal coordinated to one or more polydentate ligands to provide three or more chelate bonds to the metal, each of said polydentate ligands containing one or more pendant sites of ethylenic unsaturation.

The catalysts of this invention are found to readily tolerate 200-500 ppm levels of water in alcohol with no significant decrease in activity, in contrast to many other catalysts.

SUMMARY OF THE INVENTION

The present invention is directed to a polymer-supported catalyst wherein the catalyst contains as polymerized units a polymerizable chelated metal species. The polymerizable chelated metal species comprises a metal, coordinated to one or more polydentate ligands to provide three or more chelate bonds to the metal, each of said polydentate ligands containing one or more pendant sites of ethylenic unsaturation.

DETAILED DESCRIPTION OF THE INVENTION

The invention is a polymerizable chelated metal species having ethylenic unsaturation capable of reacting with other monomers to form polymer beads.

The invention is further directed to general heterogeneous catalysts of high activity for the production of a variety of esters, particularly methacrylate- and acrylate-based esters, by a transesterification process.

The process using the catalysts of the present invention may be illustrated by the following typical transesterification process using unsaturated esters as illustrative starting materials:

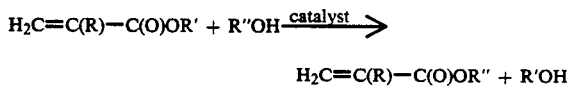

$$H_2C=C(R)-C(O)OR'' + R'OH$$

In the process, suitable starting esters include the acrylate or methacrylate esters, where R is H or CH$_3$ and R' is alkyl of from 1 to 4 carbon atoms, and preferably 1 or 2 carbon atoms; a suitable starting alcohol is represented by the formula R"OH, where R" is alkyl or cycloalkyl, for example alkyl and cyclo lower alkyl containing from 3 to 20 carbon atoms. R" may also be alkoxyalkyl, alkylphenoxyalkyl, alkylpolyphenoxyalkyl, phenylalkyl, alkylphenylalkyl, alkylmorpholinoalkyl, alkylpiperidinoalkyl, haloalkyl, cyanoalkyl, alkylthioalkyl, alkylimidazolidinones, alkyl oxazolidines, hydroxy alkyl such as hydroxyethyl, hydroxybutyl and the like, for example those derived from ethylene glycol, butanediol, polyoxyethyleneols, and the like. Preferred are those alcohols wherein the alkyl portions described in the above compounds is lower alkyl having from 2 to 20 carbon atoms. Examples of alcohols include butyl, pentyl, isodecyl, lauryl, cetyl, stearyl, alkyl ether of polyoxyethylene, 2(N-oxazolidinyl)ethyl, 2(N-morpholino)ethyl, dicyclopentenyloxyethyl, and the like. The example described above is also applicable to saturated starting materials, particularly acetates, propionate, butyrates and the like.

The heterogeneous catalyst of the present invention can be prepared by any of the polymerization techniques well known to those skilled in the art of polymerization. Suitable methods for preparing the heterogeneous catalyst of the present invention include, but are not limited to, suspension polymerization, bulk polymerization, and precipitation polymerization.

The polymerizable chelated metal species consists of a central metal ion attached by coordinate links to two or more nonmetal atoms in the same molecule, called chelate ligands. Heterocylic rings are formed with the central metal atoms as part of each ring. Ligands offering two bonds for attachment to the metal are termed "bidentate".

The polymerizable chelated metal species can be homopolymerized or polymerized in the presence of one or more copolymerized monomers. In a preferred embodiment of the present invention, heterogeneous catalysts are prepared by suspension polymerization techniques. The suspension polymers can be in the form of gellular or macroreticular beads. Preferably, when the heterogeneous catalysts of the present invention are prepared by suspension polymerization, they are macroreticular. The polymerizable chelated metal species suitable for the present invention can be represented schematically by the following general examples,

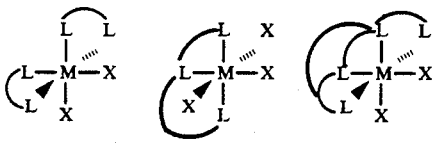

where M is a metal species selected from the group of aluminum, antimony, copper, chromium, hafnium, iron, lead, nickel, tin, titanium, vanadium, and zirconium. X is a monodentate ligand, typically an alkoxide ligand. L is polydentate ligand having more than one bond with the metal. Furthermore, L contains at least one site of ethylenic unsaturation capable of reacting with other L moieties or other copolymerizable monomers. Suitable copolymerizable monomers include: monovinyl aromatic monomers, e.g. styrene, vinyl toluene, vinylnaphthalene, ethyl vinyl benzene, acrylates and the like with, one or more polyvinyl compounds having at least two active vinyl groups, e.g., divinylbenzene, polymerizable with the monovinyl monomer to form a crosslinked insoluble copolymer.

The catalyst materials of the present invention are an improvement over previously known heterogeneous catalysts because leaching of the metal from the polymeric support is negligible.

In order to prevent the leaching of the metal from the heterogeneous catalyst into the reaction solution it is critical that the metal have polymerizable ligands which provide three or more chelate bonds. This is accomplished by using a metal species having chelate ligands containing a site of ethylenic unsaturation. The site of ethylenic unsaturation (or polymerizable unit) in the chelated metal species is capable of undergoing free-radical addition with itself or other monomers or cross-linkers during the polymerization process such that the chelated metal species becomes incorporated into the polymer. By having one or more ligands which provide three or more chelate bonds to the metal, as well as providing a site of attachment to the polymeric backbone, the leaching of the metal in the reaction solution is minimized.

For example, zirconium n-tetrabutoxide is reacted with 3-vinylbenzyl acetylacetone (VBA) to provide a polymerizable chelated metal species that may be represented by the diagramatical representation (I)

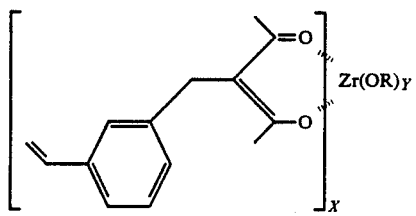

where the bracketed structure represents the polymerizable chelate ligand 3-vinylbenzyl acetylacetonate and OR represents n-butoxide ligands. The substitution pattern on the benzene ring of the 3-vinylbenzyl acetylacetonate ligand is shown as meta although para substitution is equally applicable. X and Y are integers and refer to the number of 3-vinylbenzyl acetylacetonate and n-butoxide ligands, respectively, where X is at least 2.

Other preferred transition metal species that may be incorporated into the catalyst beads by the method of this invention include 3-vinylbenzyl acetylacetonate complexes with metal alkoxides $M(OR)_x$, metal chlorides $M(Cl)_x$, metal acetates $M(CH_3COO)_x$, and metal oxides $M(O)_x$.

The transition metal species used are typically good Lewis acid catalysts and possess exchangeable ligands and accessible coordination sites. The activity of the catalyst is enhanced by the coordination of the bidentate acetylacetonate ligand. Coordination of the acetylacetonate ligands reduces the extent of self-oligomerization of the metal species and provides accessible coordination sites for catalysis to occur. The resulting species $M(VBA)_x(OR)_y (X \geq 2)$ is stable with respect to hydrolysis.

Preferably, the catalyst of the present invention is based on chelated species of metals and/or mixed chelated alkoxide species of metals represented by the following general formula (II).

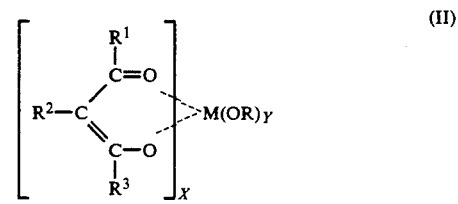

where M is a metal selected from aluminum, antimony, copper, chromium, hafnium, iron, ruthenium, palladium, lead, nickel, tin, titanium, vanadium and zirconium, where X is greater than or equal to 2 and Y plus 2X equals the coordination number of the metal and $R_1$, $R_2$ and $R_3$ are each selected from the group consisting of hydrogen, $C_1$-$C_{10}$ alkyl, $C_2$-$C_{10}$ alkenyl, phenyl, $C_1$-$C_8$ alkyl substituted phenyl, $C_2$-$C_8$ alkenyl substituted phenyl, halogen substituted phenyl, (meth)acrylamide $C_1$-$C_8$ substituted (meth)acrylamide such that one or more of $R_1$, $R_2$ and $R_3$ contain one or more sites of ethylenic unsaturation. The OR substituent may be a combination of alkoxide groups, or composed of one or more of the following: a precursor alkoxide used in a prior generation of a chelate, the alkoxide formed from the alcohol having a carbon content higher than the alkyl group of the alkyl ester, that is, the transesterifying alcohol. Structure (II) is presented as a likely and reasonably hypothesized structure of the metal chelate alkoxide complex.

Suitable chelate ligands may vary depending on the particular metal selected. In general, any chelating metal species that provides an environment where the polymerization initiator will not react with the metal and is sufficiently hydrophobic will be suitable. In addition, the metal species containing the polymerizable ligand shall be capable of being copolymerized with the monomers used in the preparation of the catalyst.

Preferred polydentate ligands for the listed metals include, for example, 3-vinylbenzyl acetylacetonate. Additional suitable polymerizable polydenate ligand are those 2-[(meth)acrylamidomethyl]-1,3 diketones disclosed in European Patent Application, Publication Number 0 345573 A2, Dec. 13, 1989. These 1-3 diketones may be represented by the general formula

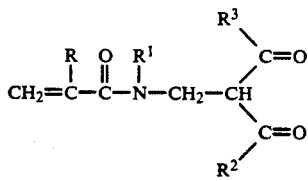

wherein the R, $R^1$, $R^2$ and $R^3$, independently of each other, have the following meanings:

R is a hydrogen atom or a methyl group, preferably a hydrogen atom;

$R^1$ is a hydrogen atom or a methyl or ethyl group, preferably a hydrogen atom;

$R^2$ and $R^3$ are alkyl groups with 1 to 6 carbon atoms, substituted or unsubstituted, for example alkyl, aryl or halogen-substituted aryl groups with 6 to 20 carbon atoms, $R^2$ and $R^3$ being equal or different from each other.

Example of $R^2$ and $R^3$ groups in general formula III are: methyl, ethyl, n-propyl, isopropyl, n-butyl, sec-butyl, tert.butyl, 1-pentyl, 2-pentyl or 3-pentyl, 1-hexyl, 2-hexyl and 3-hexyl, moreover phenyl, 2-, 3- and 4-methylphenyl, 2,4-dimethylphenyl, 4-tert.-butyl, 4-chlorophenyl, 4-bromophenyl, 4-phenyl-1-phenyl (biphenyl), 4-(4'-phenyl-1'-phenyl)-1-phenyl (triphenylyl), 1- and 2-naphthyl, 7-phenanthrenyl, 1-anthracenyl, 2-florenyl and 3-perylenyl. Methyl, ethyl, n-propyl and phenyl are preferred, methyl and phenyl being particularly preferred. These compounds with the 1-3-diketo group are free radical-polymerizable and provide the polydentate liqand bonds to keep the metal from leaching from the polymerized catalyst.

The catalysts of this invention have been successfully prepared by suspension polymerization of a number of polymerizable chelated metal species. These catalyst beads are active for the production of (meth)acrylic esters as well as acetates by transesterification processes.

The success of the catalyst can be attributed to the chelate effect created by the polymerization technique described herein. Using this technique, we have been able to reduce the deactivation of the polymer catalyst caused by the leaching of the metal into the reaction solution.

Preparation of Polymer Beads

The techniques of preparing crosslinked vinyl copolymers in bead form (generally used as precursors for conversion into ion exchange resins) by free-radical catalyzed polymerization of the monomer mixture in aqueous dispersion are well known. The term "crosslinked vinyl copolymer" and the like is used for the sake of brevity herein to signify copolymers of a major proportion, e.g., from 50 upwards to about 99.5 weight percent, preferably 80 to 99%, of monovinyl aromatic monomers, e.g., styrene, vinyl toluene, vinyl naphthalene, ethyl vinyl benzene, vinyl chlorobenzene, chloromethyl styrene, and the like, with a minor proportion, e.g., of from about 0.5 up to 80 weight percent, preferably 10 to 50 weight percent, of polyvinyl compounds having at least two active vinyl groups polymerizable with the aforesaid monovinyl monomer to form a crosslinked, insoluble, infusible copolymer, for example, divinyl benzene, trimethylol propane trimethacrylate, ethylene glycol, dimethacrylate, divinyl toluene, trivinyl benzene, divinyl chlorobenzene, diallyl phthalate, divinylpyridine, divinylnaphthalene, ethylene glycol diacrylate, neopentyl glycol dimethacrylate, diethylene glycol divinylether, bisphenol-A-dimethacrylate, pentaerythritol tetra- and trimethacrylates, divinylxylene, divinylethylbenzene, divinyl sulfone, divinyl ketone, divinyl sulfide, allyl acrylate, diallyl maleate, diallyl fumarate, diallyl succinate, diallyl carbonate, diallyl malonate, diallyl oxalate, diallyl adipate, diallyl sebacate, diallyl tartrate, triallyl silicate, triallyl tricarballylate, triallyl aconitate, triallyl citrate, triallyl phosphate, N,N'-methylene-diacrylamide, N,N'-methylene dimethacrylamide, N,N'-ethylene-diacrylamide, trivinyl naphthalene, polyvinyl anthracenes and the polyallyl and polyvinyl ethers of glycol, glycerol, pentaerythritol, resorcinol and the monothio and dithio derivatives of glycols. The copolymer may also have incorporated therein polymerized units of up to about 5 mole percent of other vinyl monomers which do not affect the basic nature of the resin matrix, for example, acrylonitrile, butadiene, methacrylic acid and others known in the art.

In one aspect this invention, the polymerizable chelated metal species, the vinyl monomer, the crosslinking monomer, and other optional monomer or monomers, are polymerized via free-radical initiation as an aqueous dispersion.

The polymerization is normally carried out at temperatures ranging from about 30° to about 95° C., preferably 45° to 85° C., and more preferably from 50° to 75° C. It is desirable to employ lower temperatures of reaction in the initial stages of the polymerization, that is until at least about 50% of the monomers in the dispersion are reacted, preferably 75% or more. The free radical initiator used in the process of the invention is one capable of catalyzing polymerization at the aforesaid temperatures. Representative initiators are di-(4-t-butylcyclohexyl) peroxydicarbonate, dicyclohexylperoxydicarbonate, di-(sec-butyl)peroxydicarbonate, di-(2-ethylhexyl) peroxy dicarbonate, dibenzyl peroxydicarbonate, diisopropyl peroxydicarbonate, azobis (isobutyronitrile), azobis (2,4-dimethylvaleronitrile), t-butyl peroxypivalate, lauroyl peroxide, benzoyl peroxide, t-butyl peroctoate, t-butyl peroxyisobutyrate, and the like. The preferred initiator for this invention is lauroyl peroxide. The amounts of initiator employed is normally from about 0.1 to about 2 percent, based on total monomer weight, preferably 0.3 to 1%.

The aqueous media in which the polymerization is conducted in dispersion form will contain minor amounts of the conventional suspension additives, that is, dispersants such as xanthan gum (biosynthetic polysaccharide), poly(diallyl dimethyl ammonium chloride), polyacrylic acid (and salts), polyacrylamide, magnesium silicate and hydrolyzed poly(styrene-maleic anhydride) protective colloids such as carboxymethyl cellulose, hydroxyalkyl cellulose, methyl cellulose, polyvinyl alcohol, gelatin, and alginates buffering acids such as phosphate and borate salts and pH control chemicals such as sodium hydroxide and sodium carbonate.

The crosslinked, high-molecular weight copolymers are preferably recovered from the reactor as hard, discrete catalytic beads of particle size within the range of about 0.02 to 2 mm, average particle size being on the order of 0.2 to 1 mm. The beads will contain between about 0.1 to about 20.0 weight percent metal, preferably from about 2.0 to about 8.0 weight percent metal.

In general, the catalytic beads of this invention are prepared by suspension polymerization as described above. The term "suspension polymerizing" is a term well-known to those skilled in the art and comprises suspending droplets of the monomer mixture in a medium in which the the monomer mixture is substantially insoluble. This may be accomplished by adding the monomer mixture with any additives to the suspending medium which contains a dispersing or suspending agent, such as, for instance, in the case of an aqueous suspending medium, the ammonium salt of a styrene-maleic anhydride copolymer, carboxymethyl cellulose, bentonite or a magnesium silicate dispersion. When this medium is agitated, the monomer phase disperses into droplets the size of the droplets depending on a number of factors, such as amount of dispersing agent, type and rate of agitation, etc. Agitation is continued at reaction temperature until polymerization is complete. The polymerized droplets, generally termed "beads", are then separated from the suspending medium and further processed, if desired.

The aqueous phase mixture for carrying out the suspension polymerization reaction generally includes water, one or more dispersing agents, a pH buffer system and stabilizers. The water is deionized. The dispersing agents may be any surface active agents compatible with the aqueous phase and organic phase reactants. The pH buffer system is preferably boric acid and sodium hydroxide as necessary. Stabilizer may be any of those used in suspension polymerization reaction mixtures. The organic phase will contain reactants including the initiators for making the beads as described above. The metal containing complexes described above will be included in the organic phase.

EXAMPLE PREPARATION

The organic phase was prepared by placing in a flask the 3-vinylbenzyl acetylacetone to which was added zirconium n-tetrabutoxide. If desired, the butanol by-product can be removed by suitable methods such as distillation. The solution was stirred and divinylbenzene, styrene and diisobutyl ketone (DIBK) were added. After about 10 minutes of stirring, the initiator, lauroyl peroxide is added. Addition of DIBK to the zirconium n-tetrabutoxide prior to the addition of 3-vinylbenzyl acetylacetone should be avoided. Zirconium alkoxide complexes are reactive with many ketones, however, the zirconium vinylbenzylacetylacetonate complexes are quite stable in the presence of ketones. The organic phase should not be allowed to stand for long periods of time, for example, not more than a few minutes to avoid polymerization.

In the preparation of the aqueous phase, the deionized water and dispersing agent were added to a reaction flask. The solution was stirred for about 15 minutes to dissolve the dispersing agent. A slight warming of the solution to about 40° may be necessary to get the dispersing agent to completely dissolve. After the dispersing agent was dissolved, additional dispersing agent was added and the solution was again stirred gently for about 15 minutes. Boric acid was then added and the pH measured after about 15 minutes. A typical pH was about 4. Sodium hydroxide solution was then added to obtain a pH of slightly greater than 7.

The organic phase was then slowly added to the aqueous phase in the reaction flask. The phases remained separate with the organic layer being the upper layer. A nitrogen sweep was applied over the solution and gentle stirring begun at about 70 rpm. The solution was then heated to about 45° C. Formations of translucent beads was observed. After about 10 minutes the stirring rate was increased stepwise in 20 rpm increments from 30 rpm to a rate of 130 rpm and the pot temperature was slowly increased to 75° C. This temperature was held overnight.

As the polymerization progresses the beads became noticeably more opaque. The next morning the heat was removed and the beads/water mixture allowed to cool. The solution was decanted and the beads rinsed with three volumes of deionized water. The beads were then placed in a SOXHLET extraction apparatus and extracted with methanol overnight. The bead products were then isolated and dried in a vacuum oven at 50° C. Table I below illustrates preparation of the catalyst beads containing zirconium, copper, iron and hafnium.

SPECIFIC EXAMPLES

The following examples set forth certain well-defined instances of the application of this invention. They are not, however, to be considered as limitations thereof, since many modifications may be made without departing from the spirit and scope of this invention.

Unless otherwise specified, all parts are parts by weight.

Preparation of 3-vinylbenzyl Acetylacetone

To 308 g of sodium acetylacetonate and 30 g of sodium iodide in 100 mL acetone (dried over 3A molecular sieves) was added dropwise 282 ml vinylbenzyl chloride (70% Meta, 30% Para), in 600 ml acetone. An ice bath was used to keep the pot temperature below 50° during the addition. The solution was maintained at 45°–50° C. until NMR samples showed no residual vinylbenzyl chloride (about 1 hour). The pot was then cooled to room temperature and placed in the refrigerator overnight. The sodium chloride was then filtered and the acetone removed at room temperature under reduced pressure. The crude product was then added to an excess of toluene (800 ml) to precipitate any remaining sodium salts. The solution was again filtered and the toluene was removed at temperatures below 50° C. under reduced pressure.

Preparation of Polymerizable Chelated Metal Species

To a solution containing 30 g of $Zr(OBu)_4 \cdot BuOH$ and 15.9 g of 3-vinylbenzyl acetylacetone (prepared above) was added 200 g of heptane. The solution was heated under reduced pressure and the butanol:heptane azeotrope removed overhead (the butanol:heptane azeotrope has a b.p. of 50° C. at 153 mm Hg with a composition of 10.3 wt. % heptane in butanol). The remaining heptane was then stripped and the pot solution cooled to room temperature. Any butanol remaining was estimated from NMR integrations.

*Catalyst Beads* A general preparation of the heterogeneous catalyst is now described.

Preparation of the Organic Phase

To a 500 mL Erlenmeyer Flask was added the polymerizable chelated metal species. The solution was stirred and the divinylbenzene, styrene, and DIBK were added. The solution was stirred for an additional 10 min. The lauroyl peroxide initiator was then added and stirred until dissolved. To avoid polymerization, the organic phase should not be allowed to stand for long periods.

| Organic Phase | Charges | wt % |
|---|---|---|
| 3-vinylbenzyl acetylacetone | 60.3 g | 29.4% |
| Zr(OBu)₄—BuOH | 32.9 g | 15.6% |
| Divinylbenzene | 61.5 g | 30.0% |
| Styrene | 28.7 g | 14.0% |
| Diisobutyl ketone (DIBK) | 20.5 g | 10.0% |
| Lauroyl peroxide | 2.0 g | 1.0% |
| Total: | 205. g | 100% |

Preparation of the Aqueous Phase

To a one liter 4 neck round bottom reaction flask equipped with a condenser, stirrer, and thermocouple/temperature controller and heating mantle were added deionized water and dispersing agent. The solution was stirred for 15 minutes. If the dispersing agent did not completely dissolve, the solution was warmed slightly (to about 40° C.). A second dispersing agent was added and the solution was stirred gently for another 15 min. Boric acid was added and the pH was checked after 15 min (Typically ca. 4). NaOH (50% soln) was added (>5 g) to obtain a pH slightly greater than 7. Acidic conditions are to be avoided since such condition may cleave the ligand from the metal with resulting hydrolysis.

| Aqueous Phase | Charges | Wt. % |
|---|---|---|
| Deionized H₂O | 283.4 g | 93.0% |
| Dispersing Agent | 17.5 g | 5.7% |
| Boric Acid | 2.9 g | 1.0% |
| NaOH (50% soln.) | As necessary | 0.3% |
| Total: | 303.8 g | 100% |

PROCEDURE

The organic phase was slowly added to the aqueous phase in the reaction flask. The phases remained separated with the organic layer being the upper layer. A N₂ sweep was applied over the solution and gentle stirring was initiated (70 rpm). The solution was then heated to 45° C. The formation of translucent beads could be observed shortly after stirring was started. The stirring rate was increased stepwise at 10 minute intervals by 30 rpm to a rate of 130 rpm. At this time, the pot temperature is slowly increased to 65° C. and controlled at this temperature overnight. As the polymerization progressed, the beads become noticeably more opaque. The next morning the heat is removed and the beads/water mixture allowed to cool. The solution was decanted and the beads rinsed with 3 bed volumes of deionized water. The beads were then placed into a Soxhlet extraction thimble and extracted with methanol overnight. The beads were then isolated and dried under vacuum.

In the examples the following abbreviations are used
DEGDVE is diethyleneglycol divinylether
DVB is divinylbenzene
VBA is vinylbenzylacetylacetone

TABLE I

| Example # | % DVB | % DEGDVE | % Styrene | % VBA | % Metal (Exp.) |
|---|---|---|---|---|---|
| 1 | 22 | 0 | 18 | 38 | Zr = 4 |
| 2 | 32 | 0 | 0 | 38 | Zr = 12 |

TABLE I-continued

CATALYST BEAD PREPARATIONS

| Example # | % DVB | % DEGDVE | % Styrene | % VBA | % Metal (Exp.) |
|---|---|---|---|---|---|
| 3 | 15 | 0 | 13 | 54 | Zr = 17 |
| 4 | 19 | 0 | 16 | 46 | Zr = 8 |
| 5 | 19 | 0 | 16 | 46 | Zr = 9 |
| 6 | 17 | 3 | 16 | 46 | Zr = 5 |
| 7 | 22 | 0 | 18 | 38 | Zr = 9 |
| 8 | 22 | 0 | 18 | 38 | Zr = 15 |
| 9 | 19 | 4 | 18 | 38 | Zr = 5 |
| 10* | 22 | 0 | 19 | 40 | 0 |
| 11 | 19 | 4 | 18 | 38 | Cu = .23 |
| 12 | 29 | 4 | 18 | 38 | Zr = 4.7 |
| 13 | 40 | 2 | 6 | 38 | Zr = 5.2 |
| 14 | 41 | 2.1 | 6.6 | 40 | Fe = 0.33 |
| 15 | 19 | 4 | 18 | 37 | $H_f$ = 7.3 |

*Control - No metal species added.

Table II below shows the relationship of cross-linked DVB to catalyst Bead physical parameters.

TABLE II

| Sample | % Zr | % DVB Crosslinked | Surface Area | Porosity | Av. Pore Diameter |
|---|---|---|---|---|---|
| 9 | 5.0 | 19 | 123 m2/g | 0.47 cm3/g | 151Å |
| 12 | 4.7 | 29 | 180 m2/g | 0.64 cm3/g | 135Å |
| 13 | 5.2 | 40 | 330 m2/g | 0.70 cm3/g | 82Å |

CATALYST EVALUATION

The catalyst beads were evaluated in a transesterification reactor. Reactions were run using excess ester (5:1 or 2:1 mole ratios) to ensure sufficient solvent for removal of the ester:alcohol azeotrope as well as to keep pot temperatures below 115° in the case of the high boiling alcohols, e.g., lauryl alcohol. All final conversions reported were obtained from GLC analysis of pot samples and comparison of the ratio of starting alcohol:product ester. The overhead was also monitored and sampled to corroborate the pot analyses and to give information concerning the relative rates of reaction. For all methacrylate transesterification reactions the starting ester:alcohol mixes were dehydrated in a separate step prior to reaction by removal of the water as an ester: H₂O azeotrope. For the acetate reactions anhydrous ethyl acetate, anhydrous 1-butanol, and 1-dodecanol were used as supplied.

The following examples compare heterogeneous catalysts made as described above when used in transesterification reactions showing that very small amounts of the zirconium are released by the catalyst and lost in the liquid solution.

EXAMPLE 16

Butyl Acetate

Two hundred twenty three grams (2.5 moles) of ethyl acetate, 37 g (0.5 moles) butanol, and 30 grams of the heterogeneous zirconium vinylbenzyl acetylacetonate/styrene/divinylbenzene catalyst were added to a 500 ml flask equipped with an agitator, thermocouple, and a 10-tray Oldershaw fractional distillation column. The mixture was heated to reflux at atmospheric pressure while an azeotropic mixture of ethyl acetate and ethanol was removed from the upper part of the fractionating column. The reaction was continued in this manner for approximately 6 hours while the temperature at the top of the column was 72°-74° C. and the temperature in the pot was 82°-85° C. In the transesterification reaction gas-liquid chromatography analysis showed 80% conversion of BuOH with a selectivity to butyl acetate >99%.

The liquid solution was analyzed for Zr and found to contain <1 ppm Zr. The solution was decanted and a fresh charge of ethyl acetate and BuOH were added. The catalyst was used in 12 similar batch cycles with no apparent decrease in activity.

EXAMPLE 17

Dodecy Acetate

Two hundred fourteen grams (2.4 moles) of ethyl acetate, 86 g of 1-dodecanol (0.46 moles), and 30 grams of the heterogeneous zirconium vinylbenzyl acetylacetonate/styrene/divinylbenzene catalyst were added to a 500 ml flask equipped with an agitator, thermocouple, and a 10-tray Oldershaw fractional distillation column. The mixture was heated to reflux at atmospheric pressure while an azeotropic mixture of ethyl acetate and ethanol was removed from the top of the distillation column. The reaction was continued for 6 hours while the temperature at the top of the column was 72°-74° C. and the temperature in the pot was 82°-85° C. Gas liquid chromatography (GLC) analysis showed 37% conversion of 1-dodecanol with a selectivity of >95%.

EXAMPLE 18

Butyl Methacrylate

Two hundred six grams of a reaction mix containing a 5:1 mole ratio of methyl methacrylate, 1-butanol, and 100 ppm phenothiazine as inhibitor were added to a 500 ml flask equipped with an agitatior, thermocouple, and a 10-tray Oldershaw fractional distillation column. Thirty grams of the heterogeneous zirconium vinylbenzyl acetylacetonate/styrene/divinylbenzene catalyst was added. The mixture was heated to reflux at atmospheric pressure while an azeotropic mixture of methyl methacrylate and methanol was removed from the upper portion of the fractionating column. The reaction was continued in this manner for 6 hours while the temperature at the column was 64°-67° C. and the temperature in the pot was 101°-107° C. Gas liquid chromatography (GLC) analysis showed 60% conversion of 1-butanol with a selectivity to butyl methacrylate of 99%.

The liquid solution was analyzed for Zr and found to contain <2 ppm Zr.

EXAMPLE 19

Dodecyl Methacrylate

Two hundred six grams of a reaction mix containing a 5:1 mole ratio of methyl methacrylate, 1-dodecanol, and 100 ppm phenothiazine as inhibitor were added to a 500 ml flask equipped with an agitatior, thermocouple, and a 10-tray Oldershaw fractional distillation column. Thirty grams of the heterogeneous zirconium vinylbenzyl acetylacetonate/styrene/divinylbenzene catalyst was added. The mixture was heated to reflux at atmospheric pressure while an azeotropic mixture of methyl methacrylate and methanol was removed from the upper portion of the fractionating column. The reaction was continued in this manner for 6 hours while the temperature at the column was 64°-67° C. and the temperature in the pot was 101°-107° C. Gas liquid chromatography (GLC) analysis showed 30% conversion of 1-dodecanol with a selectivity to dodecyl methacrylate of 95%.

The liquid solution was analyzed for Zr and found to contain <2 ppm Zr.

COMPARATIVE EXAMPLE

In this comparative example following the teachings of S. Bhaduri, et. al., cited above, a polymer containing the pentane-2,4-dionato zirconium moeity was prepared in a stepwise fashion. First, a polymer containing the 2,4-pentanedionato unit was prepared from known methods. In a separate second step the zirconium was incorporated through a ligand-exchange process. This stepwise procedure provides for only two chelate bonds to the zirconium because the 2,4-pentanedionato units are spatially fixed in the first step. This is in contrast to the catalyst prepared in the present invention where the polymerizable chelated metal species is directly incorporated into the polymerization process and the metal is attached through three or more chelate bonds. The former catalyst shows a significant loss of the zirconium into the solution.

Vinylbenzyl acetylacetone/styrene/divinylbenzene polymer beads were prepared as described in the catalyst preparation except no $Zr(OBu)_4 \cdot BuOH$ was used. These polymer beads (13.7 g) were then evaluated in transesterification reactions of solution containing 617 g of 5:1 mole ratio methyl methacrylate: 1-butanol to which homogeneous 0.925 g $Zr(OBu)_4 \cdot BuOH$ and 500 ppm of monomethyl ether of hydroquinone as inhibitor were added. After six hours a 1-butanol conversion of 67% was achieved. For comparison, homogeneous $Zr(OBu)_4 \cdot BuOH$ yields <10% conversion over the same time period, suggesting that the Zirconium has been incorporated into the 2,4-pentanedione containing polymer beads.

The reaction solution was decanted and a fresh charge of 617 g 5:1 methyl methacrylate: 1-butanol was added. After six hours <5% conversion was achieved. Analysis of the initially decanted solution showed that >90% of the Zr was in solution and, therefore, not incorporated into the polymer beads. Subsequent runs using the polymer beads showed no activity. Thus, the zirconium had been leached from the beads during the reaction leaving the polymer beads with little or no catalytic activity.

What we claim is:

1. A process for making a polymer-supported catalyst, comprising: copolymerizing a suspended mixture comprising
   (a) vinyl monomers
   (b) crosslinking monomers, and
   (c) polymerizable chelated metal species wherein the metal species is coordinated to one or more polydentate ligands to provide three or more chelate bonds to the metal, each of said polydentate ligands containing one or more pendant sites of ethylenic unsaturation, and wherein the metal is selected from aluminum, antimony, copper, chromium, hafnium, iron, ruthenium, palladium, lead, nickel, tin, titanium, vanadium and zirconium.

2. The process of claim 1, wherein: the vinyl monomers are up to 99.9 weight % of the suspended mixture, the crosslinking monomers are up to 60 weight % of the suspended mixture, and the polymerizable chelated metal species is up to about 20 weight % of the suspended mixture.

3. The process of claim 1, wherein: the metal is selected from aluminum, antimony, copper, chromium, hafnium, iron, lead, nickel, tin, titanium, vanadium and zirconium.

4. The process of claim 1, wherein: the metal is zirconium.

5. The process of claim 1, wherein: the polydentate ligand is selected from vinylbenzyl acetylacetonate and 2-[(methyl)acrylamidomethyl]-1,3-diketone.

6. The process of claim 1, further comprising: (d) 25 to 150% by weight, based on monomer weight, of an organic liquid which is a solvent for the monomers but is unable to substantially swell a copolymer resulting from copolymerization.

7. The process of claim 6, wherein the organic liquid which is a solvent for the monomers is diisobutyl ketone.

8. The process of claim 1, wherein the vinyl monomers are selected from styrene, vinyl toluene, vinyl naphthalene, ethyl vinyl benzene, vinyl chlorobenzene and chloromethyl styrene.

9. A polymer-supported catalyst prepared by the process of claim 1.

* * * * *